US012417103B2

(12) United States Patent
Waterman et al.

(10) Patent No.: US 12,417,103 B2
(45) Date of Patent: Sep. 16, 2025

(54) FUSION WITH DESTRUCTIVE INSTRUCTIONS

(71) Applicant: SiFive, Inc., San Mateo, CA (US)

(72) Inventors: Andrew Waterman, Berkeley, CA (US); Krste Asanovic, Oakland, CA (US)

(73) Assignee: SiFive, Inc., Santa Clara, CA (US)

( * ) Notice: Subject to any disclaimer, the term of this patent is extended or adjusted under 35 U.S.C. 154(b) by 69 days.

(21) Appl. No.: 18/344,986

(22) Filed: Jun. 30, 2023

(65) Prior Publication Data

US 2024/0020126 A1  Jan. 18, 2024

Related U.S. Application Data

(60) Provisional application No. 63/388,621, filed on Jul. 12, 2022.

(51) Int. Cl.
*G06F 9/38* (2018.01)
*G06F 9/30* (2018.01)

(52) U.S. Cl.
CPC ........ *G06F 9/3836* (2013.01); *G06F 9/30098* (2013.01)

(58) Field of Classification Search
None
See application file for complete search history.

(56) References Cited

U.S. PATENT DOCUMENTS

| 10,996,952 | B2 * | 5/2021 | Asanovic | G06F 9/3017 |
|---|---|---|---|---|
| 11,861,365 | B2 * | 1/2024 | Asanovic | G06F 9/30145 |
| 2011/0264891 | A1 * | 10/2011 | Parks | G06F 9/3854 |
| | | | | 712/E9.023 |
| 2014/0281389 | A1 * | 9/2014 | Loktyukhin | G06F 9/3017 |
| | | | | 712/206 |
| 2016/0179542 | A1 * | 6/2016 | Lai | G06F 9/45525 |
| | | | | 712/208 |
| 2017/0060579 | A1 * | 3/2017 | Vincent | G06F 9/321 |
| 2019/0196825 | A1 * | 6/2019 | Grocutt | G06F 17/16 |
| 2022/0027161 | A1 * | 1/2022 | Kawakami | G06F 9/3838 |

* cited by examiner

*Primary Examiner* — Michael Sun
(74) *Attorney, Agent, or Firm* — Kilpatrick Townsend & Stockton LLP

(57) ABSTRACT

Systems and methods are disclosed for fusion with destructive instructions. For example, an integrated circuit (e.g., a processor) for executing instructions includes a fusion circuitry that is configured to detect a sequence of macro-ops stored in a processor pipeline of the processor core, the sequence of macro-ops including a first macro-op identifying a first register as a destination register followed by a second macro-op identifying the first register as both a source register and as a destination register, wherein one or more intervening macro-ops occur between the first macro-op and the second macro-op in the program order; determine a micro-op that is equivalent to the first macro-op followed by the second macro-op; and forward the micro-op to at least one of the one or more execution resource circuitries for execution. For example, the sequence of macro-ops may be detected in a vector dispatch stage of a processor pipeline.

20 Claims, 8 Drawing Sheets

FUSION WITH DESTRUCTIVE INSTRUCTIONS

CROSS-REFERENCE TO RELATED APPLICATION(S)

This application claims priority to and the benefit of U.S. Provisional Patent Application Ser. No. 63/388,621, filed Jul. 12, 2022, the entire disclosure of which is hereby incorporated by reference.

TECHNICAL FIELD

This disclosure relates to fusion with destructive instructions.

BACKGROUND

Processors sometimes perform macro-op fusion, where several Instruction Set Architecture (ISA) instructions are fused in the decode stage and handled as one internal operation. Macro-op fusion is a powerful technique to lower effective instruction count. Recent research into this issue, specifically in the context of RISC-V architectures, has identified a limited set of areas where macro-op fusion can avoid instruction set complexities. See, e.g. "The Renewed Case for the Reduced Instruction Set Computer: Avoiding ISA Bloat with Macro-Op Fusion for RISC-V" by Christopher Celio, et. al., 8 Jul. 2016, arXiv:1607.02318 [cs.AR]. However, that paper's approach does not contemplate a number of macro-op fusion opportunities that can increase efficiency. Intel has done work with fused instructions, such as that described in U.S. Pat. No. 6,675,376. Earlier work includes the T9000 Transputer by Inmos, as described in "the T9000 Transputer Hardware Reference Manual", Inmos, 1$^{st}$ Edition, 1993.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
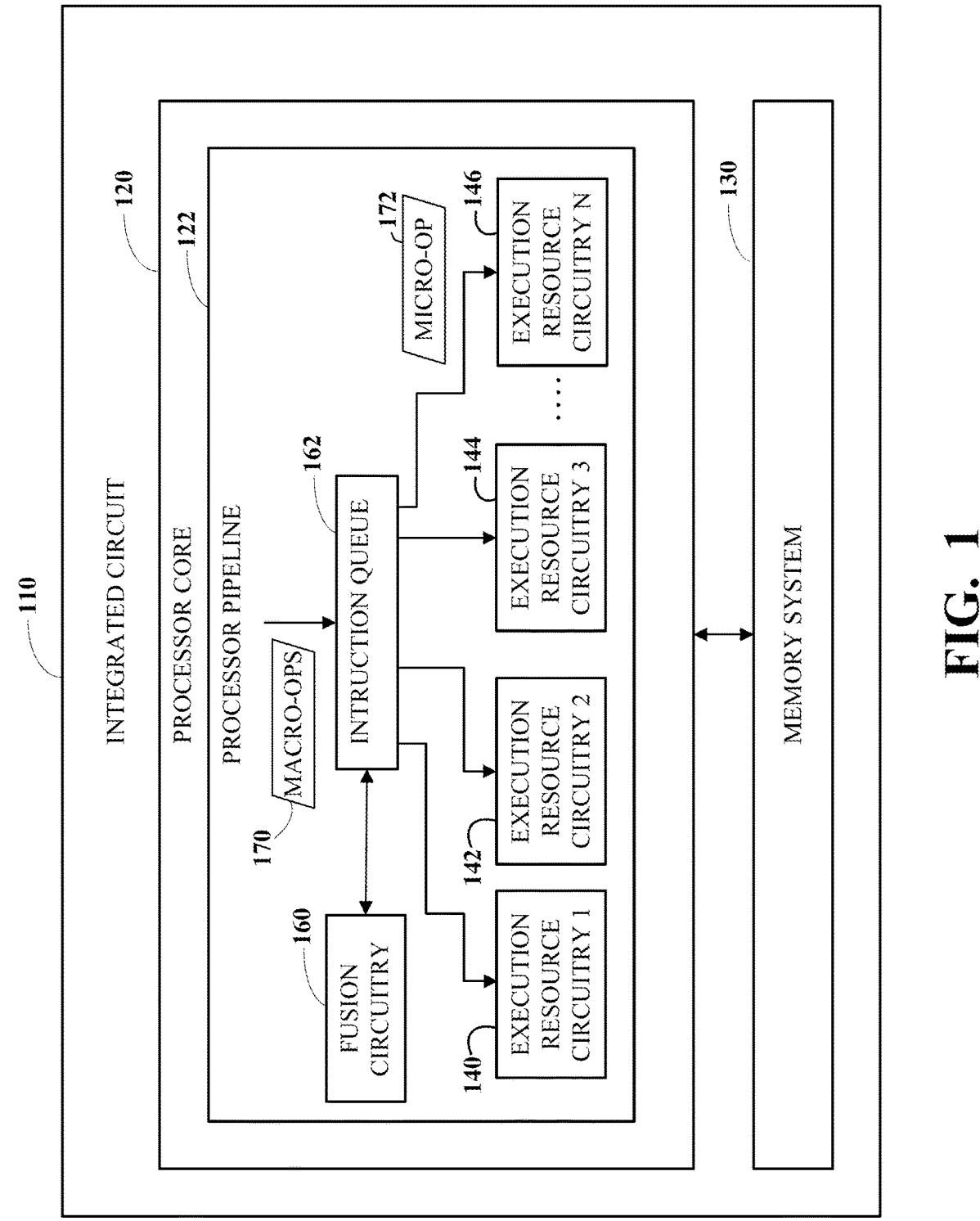
FIG. 1 is a block diagram of an example of an integrated circuit for fusion with destructive instructions.

Systems and methods are described herein that may be used to implement fusion with destructive instructions. Instruction set architectures may use destructive operations, where a destination register is same as one of source registers, to save instruction-encoding space. For example, using a destructive instruction may reduce the number of arguments of an instruction from three to two:

Vd=vd op va instead of vd=va op vb

Or, in the case of three inputs, from four to three:

Vd=vd op1 va op2 vb instead of vd=vc op1 va op2 vb

A challenge is, in some cases, that input arguments are still needed after the instruction executes. This can be addressed by adding an instruction (e.g., a move instruction) before the destructive instruction in order to preserve the value of an input argument, but executing this extra instruction can reduce performance.

In some implementations, macro-op fusion is employed by a processor to combine destructive instructions with earlier instructions that write to the same register as their destructive argument. For example, this fusion may serve to mitigate a performance penalty associated with encoding non-destructive operations by pairs of instructions including a destructive operation.

An example, from the RISC-V instruction set architecture, of this fusion is converting a move followed by a destructive operation, into non-destructive operation:

Vmv.v vd, va #Vd=va

Vfmacc.vv vd, vb, vc, #Vd+=vb*vc

May be fused into:

Vfmadd.vv vd, va, vb, vc #vd=va+vb*vc

In the RISC-V vector v1.0 specification, there are only destructive multiply-add instructions, which overwrite the add input, so if you need to not destroy the add input you first copy it using a move.

This disclosure describes schemes to allow an ordinary standalone instruction, rather than a special prefix instruction designed for fusion, to be used to augment the argument list of a destructive instruction. Also, the destructive instruction does not have to immediately follow the earlier instruction, there can be intervening instructions (e.g., scalar instructions), as long as they don't cause a condition for the fusion to be violated (e.g., by changing the vector length setting applicable to the two instructions). For example, the conditions for fusion of first vector instruction followed by a destructive vector instruction may include: (1) both instructions have the same active vector length; (2) both instructions have the same masking control, either both unmasked or both have same mask register argument; and (3) the first instruction writes the destructive operand of the second instruction.

Consider the following example with masking:

Vmerge.vv vd, va, vd, vm #vd[i]=if (vm[i]) va[i] else vd[i]

Vfmacc.vv vd, vb, vc, vm #vd[i]=if (vm[i]) (vd[i]+vb[i]*vc[i]) else vd[i]

These may be merge to:

Vfmadd.vvv vd, va, vb, vc, vm #vd[i]=if (vm[i]) (va[i]+vb[i]*vc[i]) else vd[i] where Vm is the mask register argument (e.g., always v0.t in RISC-V Vector extension 1.0).

Another example of a fusion case is where the first instruction "splats" a scalar to all elements of second instruction's destination vector:

Vmv.v.f vd, fa #vd[i]=fa for all i

Vfmacc.vv vd, vb, vc #vd[i]=vd[i]+vb[i]*vc[i]

These may be fused to an internal micro-op equivalent:
Vfmacc.vvf vd, fa, vb, vc #vd[i]=fa+vb[i]*vc[i]

Some implementations may enable non-consecutive fusing. Because the first instruction is ordinary standalone instruction (not a special prefix instruction), it does not have to be fused, and can be executed independently of second instruction.

In a decoupled vector implementation, a fetch/decode instruction stream can queue up vector instructions separately from scalar instructions. This pipeline structure can facilitate fusing vector instructions that are consecutive in the vector instruction queue even if they were not consecutive in the instruction stream fetched from memory. This pipeline structure may provide the feature of taking fusion off the critical decoder path for the scalar instruction stream.

These forms of fusion with destructive instructions may be implemented in an in-order machine with a decoupled vector unit—making use of a vector instruction queue structure. These forms of fusion with destructive instructions may be implemented in an out-of-order machine. For example, an out-of-order machine may have internal an in-order decoupled vector queue and fusion may be implemented when dispatching vector instructions to reservation stations. This pipeline structure may avoid renaming intermediate values, saving a physical vector register.

An in-order decoupled vector queue can be used to resolve dynamic vector length, which needs to be the same on first and second instructions for fusion. The mask register operand is a function of the instruction encoding, so it is known when the instruction enters the vector queue. This allows for a check that both instructions read the same mask register or both instructions are unmasked.

Some implementations may provide advantages over conventional computer processors, such as, for example, enabling non-destructive operations to be encoded by pairs of more compact instructions including a destructive instruction while mitigating a performance penalty from the two-instruction encoding, avoiding backup of scalar instructions in a pipeline supporting scalar and vector instructions, and/or increasing the speed/performance of a processor in some conditions.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

Details

FIG. 1 is a block diagram of an example of an integrated circuit 110 for fusion with destructive instructions. The integrated circuit 110 includes a processor core 120 and a memory system 130. The processor core 120 includes a processor pipeline 122, which includes execution resource circuitries (140, 142, 144, and 146) configured to execute micro-ops 172 to support an instruction set architecture including macro-ops. The processor core 120 is configured to fetch macro-ops from the memory system in a program order. Some of these macro-ops 170 pass through the processor pipeline 122 into an instruction queue 162. The integrated circuit 110 includes a fusion circuitry 160 that is configured to detect a sequence of macro-ops stored in the processor pipeline 122 of the processor core 120 (e.g., in the instruction queue 162), the sequence of macro-ops including a first macro-op identifying a first register as a destination register followed by a second macro-op identifying the first register as both a source register and as a destination register; determine a micro-op that is equivalent to the first macro-op followed by the second macro-op; and forward the micro-op to at least one of the one or more execution resource circuitries (140, 142, 144, and 146) for execution. In some implementations, one or more intervening macro-ops occur between the first macro-op and the second macro-op in the program order. For example, the sequence of macro-ops is detected when the first macro-op and the second macro-op are stored in the instruction queue 162, and the instruction queue 162 is in a vector dispatch stage of the processor pipeline 122 that operates in parallel with a scalar dispatch stage of the processor pipeline 122. This fusion may mitigate a performance penalty associated with encoding complex non-destructive operations with macro-ops of a compact instruction set that relies on destructive instructions. For example, the integrated circuit 110 may be used to implement the process 400 of FIG. 4. For example, the integrated circuit 110 may be used to implement the process 500 of FIG. 5. For example, the integrated circuit 110 may be used to implement the process 600 of FIG. 6.

The integrated circuit 110 includes a memory system 130, which may include memory storing instructions and data and/or provide access to memory external to the integrated circuit 110 that stores instructions and/or data. For example, the memory system 130 may include random access memory. For example, the memory system 130 may include an L2 cache, which may be configured to implement a cache coherency protocol/policy to maintain cache coherency across multiple L1 caches. Although not shown in FIG. 1, the integrated circuit 110 may include multiple processor cores in some implementations. For example, the memory system 130 may include multiple layers.

The integrated circuit 110 includes a processor core 120 including a one or more execution resource circuitries (140, 142, 144 and 146) configured to execute micro-ops 172 to support an instruction set architecture including macro-ops 170. The processor core 120 is configured to fetch macro-ops 170 from the memory system 130 in a program order. For example, the instruction set architecture may be a RISC-V instruction set architecture. For example, the one or more execution resource circuitries (140, 142, 144, and 146) may include an adder, a shift register, a multiplier, a floating-point unit a vector adder, a vector multiply accumulate unit, and/or a load/store unit. The one or more execution resource circuitries (140, 142, 144, and 146) may update the state of the integrated circuit 110, including internal registers and/or flags or status bits (not explicitly shown in FIG. 1) based on results of executing a micro-op. Results of execution of a micro-op may also be written to the memory system 130.

The integrated circuit 110 includes a fusion circuitry 160 that is configured to detect a sequence of macro-ops stored in a processor pipeline 122 of the processor core 120, the sequence of macro-ops including a first macro-op identifying a first register as a destination register followed by a second macro-op identifying the first register as both a source register and as a destination register. The fusion circuitry 160 is configured to determine a micro-op that is equivalent to the first macro-op followed by the second macro-op. The fusion circuitry 160 is configured to forward the micro-op to at least one of the one or more execution resource circuitries (140, 142, 144, and 146) for execution. For example, the micro-op may be forwarded directly to an execution resource circuitry 146 or may be forwarded to the execution resource circuitry 146 via one or more intervening stages (e.g., through an issue stage and/or a register rename stage) of the processor pipeline 122. For example, the first macro-op may be a vector instruction, the second macro-op may be a vector instruction, and the first register may be a vector register of the instruction set architecture. In some implementations, one or more intervening macro-ops occur between the first macro-op and the second macro-op in the program order. For example, the one or more intervening macro-ops may be one or more scalar instructions of the instruction set architecture. In some implementations, the fusion circuitry 160 is configured to detect the sequence of macro-ops when the first macro-op and the second macro-op are stored in an instruction queue 162 in a vector dispatch stage of the processor pipeline 122, and the one or more intervening macro-ops are sent to a scalar dispatch stage of the processor pipeline 122 that operates in parallel with the vector dispatch stage. The first macro-op may be a standalone instruction that can be executed independently of the second macro-op, rather than a prefix instruction with errant or indeterminant results when not followed by the second macro-op.

These forms of fusion may be applied to a variety of sequences of instructions meeting a criteria. For example, the conditions for fusion of the first macro-op followed by the second macro-op may include: (1) both instructions have a same active vector length; (2) both instructions have the same masking control, either both unmasked or both have same mask register argument; and (3) The first instruction writes the destructive operand of second instruction. In some implementations, the first macro-op is a vector move instruction and the second macro-op is a destructive vector multiply accumulate instruction. For example, the sequence of RISC-V macro-ops:

Vmv.v vd, va #Vd=va
Vfmacc.vv vd, vb, vc, #Vd+=vb*vc
may be fused into a micro-op:
Vfmadd.vv vd, va, vb, vc #vd=va+vb*vc In some implementations, the first macro-op is a masked vector merge instruction and the second macro-op is a destructive vector multiply accumulate instruction. For example, the sequence of RISC-V macro-ops:

Vmerge.vv vd, va, vd, vm #vd[i]=if (vm[i]) va[i] else vd[i]
Vfmacc.vv vd, vb, vc, vm #vd[i]=if (vm[i]) (vd[i]+vb[i]*vc[i]) else vd[i]
may be fused into a micro-op:
Vfmadd.vvv vd, va, vb, vc, vm #vd[i]=if (vm[i]) (va[i]+vb[i]*vc[i]) else vd[i]

In some implementations, the first macro-op is a scalar-to-vector move instruction and the second macro-op is a destructive vector multiply accumulate instruction. For example, the sequence of RISC-V macro-ops:

Vmv.v.f vd, fa #vd[i]=fa for all i
Vfmacc.vv vd, vb, vc #vd[i]=vd[i]+vb[i]*vc[i]
may be fused into a micro-op:
Vfmacc.vvf vd, fa, vb, vc #vd[i]=fa+vb[i]*vc[i]

For example, one or more of the execution resource circuitries (140, 142, 144, and 146) of the processor core 120 may be configured to execute these micro-ops resulting from fusion.

The fusion circuitry 160 may be configured to perform checks on the sequence of macro-ops to confirm that it is a viable candidate for fusion. In some implementations, vector length is a dynamically configurable parameter of the processor core 120 and the fusion circuitry 160 is configured to check that the first macro-op and second macro-op have a same vector length as a condition for determining the micro-op. In some implementations, the fusion circuitry 160 is configured to check that the first macro-op and second macro-op have a same mask argument as a condition for determining the micro-op. For example, detecting the sequence of macro-ops may include implementing the process 600 of FIG. 6.

In some implementations, the instruction queue 162 is in a vector dispatch stage of the processor pipeline 122. The fusion circuitry 160 may be configured to detect the sequence of macro-ops when the first macro-op and the second macro-op are stored in the instruction queue 162 in a vector dispatch stage of the processor pipeline 122 that stores vector instructions received from a scalar dispatch stage of the processor pipeline 122. For example, the processor pipeline 122 may be the processor pipeline 200 of FIG. 2A. The fusion circuitry 160 may be configured to detect the sequence of macro-ops when the first macro-op and the second macro-op are stored in the instruction queue 162 in a vector dispatch stage of the processor pipeline 122 that operates in parallel with a scalar dispatch stage of the processor pipeline 122. For example, the processor pipeline 122 may be the processor pipeline 250 of FIG. 2B. For example, the processor pipeline 122 may be the processor pipeline 270 of FIG. 2C. Detecting the sequence of macro-ops in a vector dispatch queue may simplify the detection of the sequence in the presence of intervening instructions occurring between the first macro-op and the second macro-op. Detecting the sequence of macro-ops in a vector dispatch queue may take the fusion operation out of the critical path of scalar instructions and improve performance of the processor core 120.

These structures may be implemented in a variety of types of processor cores. For example, the processor core 120 may be an in-order machine. In some implementations, the processor core 120 is an out-of-order machine that includes an internal in-order decoupled vector queue 162, and the fusion circuitry 160 is configured to detect the sequence of macro-ops when dispatching vector instructions to reservation stations.

Figure 2A:
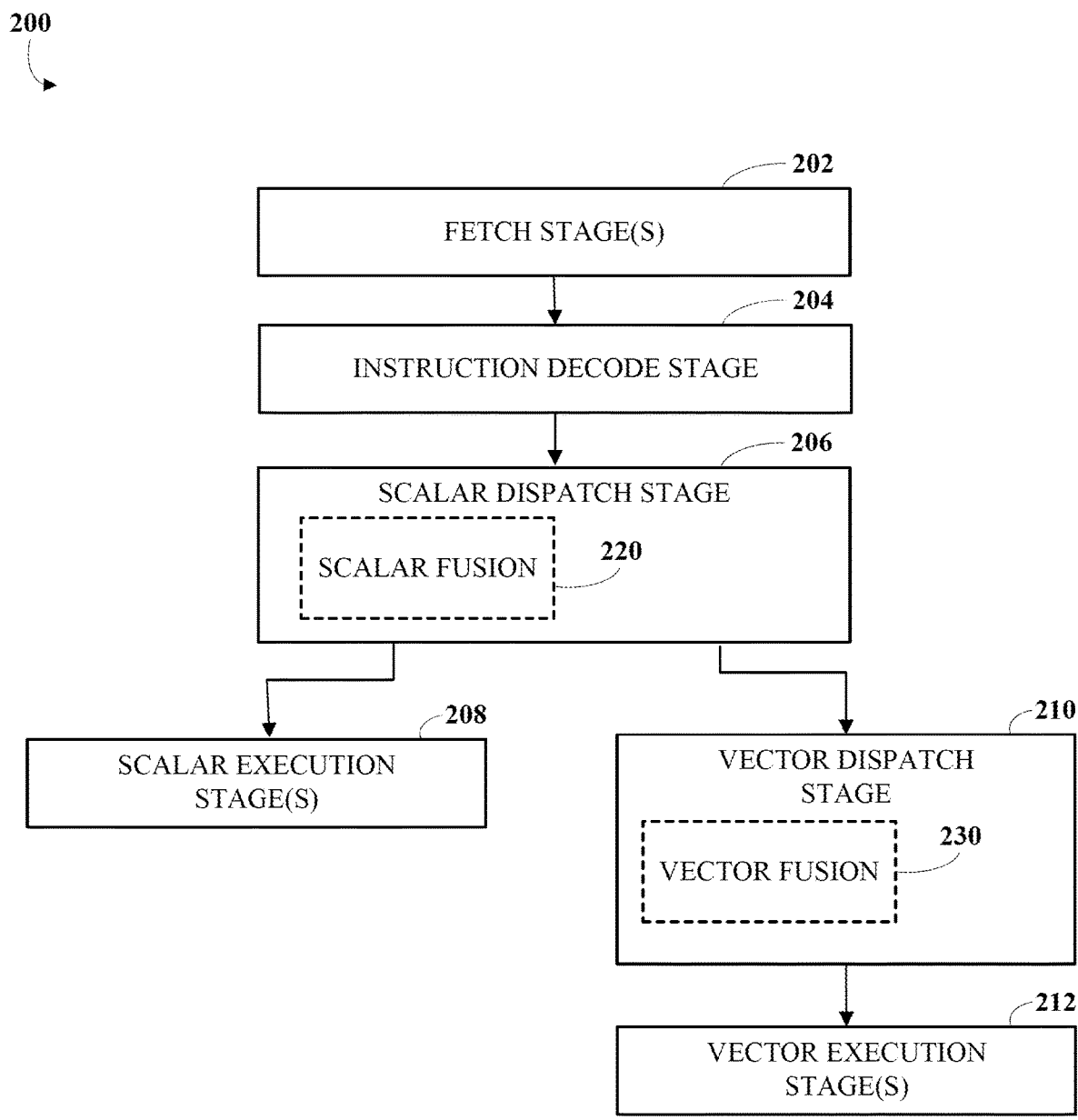
FIG. 2A is a block diagram of an example of a processor pipeline for fusion with destructive instructions.

FIG. 2A is a block diagram of an example of a processor pipeline 200 for fusion with destructive instructions. For example, the processor pipeline 200 may be implemented in an in-order decoupled vector machine. The processor pipeline 200 includes one or more fetch stages 202; an instruction decode stage 204; a scalar dispatch stage 206; one or more scalar execution stages 208; a vector dispatch stage 210; and one or more vector execution stages 212. The vector dispatch stage 210 stores vector instructions received from the scalar dispatch stage 206. For example, the vector dispatch stage 210 may be implemented in a decoupled vector unit. The upstream stages (e.g., the instruction decode stage 204 and/or the scalar dispatch stage 206) in the processor pipeline 200 identify and segregate vector macro-ops as they pass through the processor pipeline 200 and forward them to the vector dispatch stage 210 to await dispatch to an appropriate vector execution stage 212. Scalar macro-ops and/or scalar micro-ops may be instead forwarded to an appropriate scalar execution stage 208. Macro-op fusion 220 may be applied to scalar instruction as they pass through the scalar dispatch stage 206, while vector macro-ops are passed to the vector dispatch stage 210. Macro-op fusion 230 may be applied to vector instructions as they pass through the vector dispatch stage 210. In some implementations, a fusion circuitry (e.g., the fusion circuitry 160) is configured to detect the sequence of macro-ops when the first macro-op and the second macro-op are stored in an instruction queue in the vector dispatch stage 210 of the processor pipeline 200. Performing the fusion in the vector dispatch stage 210 may take the fusion out of the critical path for scalar instructions, which may be more time sensitive in some cases. Thus, performance of the processor pipeline 200 may be improved by performing fusion of vector instructions in the vector dispatch stage 210, after the vector instructions have been separated from the scalar instructions.

Performing fusion for vector instructions in the vector dispatch stage 210 may also simplify the detection of sequences of vector macro-ops that are candidates for fusion, where one or more intervening macro-ops occurring between the first macro-op and the second macro-op of the sequence of macro-ops in the program order are scalar macro-ops. These intervening scalar macro-ops may be sent to the scalar execution stage 208 of the processor pipeline 200 that operates in parallel with the vector dispatch stage 210. The absence of these intervening scalar macro-ops in the vector dispatch stage 210 may bring the first macro-op and the second macro-op closer together in an instruction queue (e.g., even making them consecutive within an instruction queue of the vector dispatch stage 210), thus making the sequence easier to detect.

Figure 2B:
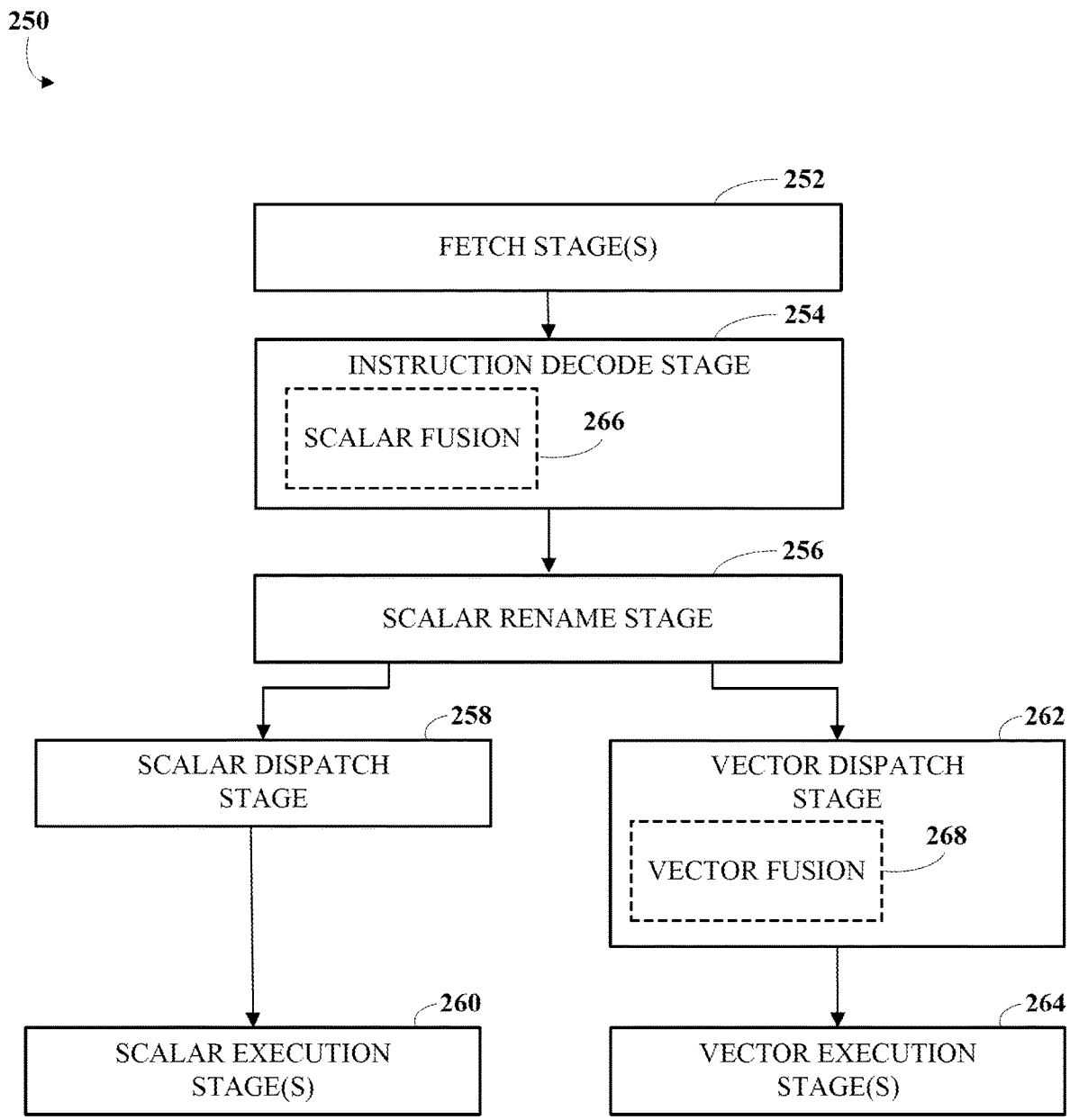
FIG. 2B is a block diagram of an example of a processor pipeline for fusion with destructive instructions.

FIG. 2B is a block diagram of an example of a processor pipeline 250 for fusion with destructive instructions. For example, the processor pipeline 250 may be implemented in an out-of-order machine. The processor pipeline 250 includes one or more fetch stages 252; an instruction decode stage 254; a scalar rename stage 256; a scalar dispatch stage 258; one or more scalar execution stages 260; a vector dispatch stage 262; and one or more vector execution stages 264. The vector dispatch stage 262 operates in parallel with a scalar dispatch stage 258. The upstream stages (e.g., the instruction decode stage 254 and the scalar rename stage 256) in the processor pipeline 250 identify and segregate vector macro-ops as they pass through the processor pipeline 250 and forward them to the vector dispatch stage 262 to await dispatch to an appropriate vector execution stage 264. Scalar macro-ops and/or scalar micro-ops may be instead forwarded to the scalar dispatch stage 258 to await dispatch to an appropriate scalar execution stage 260. Macro-op fusion 266 may be applied to scalar instruction as they pass through the instruction decode stage 254, while vector macro-ops are passed to the vector dispatch stage 262. Macro-op fusion 268 may be applied to vector instructions as they pass through the vector dispatch stage 262. In some implementations, a fusion circuitry (e.g., the fusion circuitry 160) is configured to detect the sequence of macro-ops when the first macro-op and the second macro-op are stored in an instruction queue in the vector dispatch stage 262 of the processor pipeline 250. Performing the fusion in the vector dispatch stage 262 may take the fusion out of the critical path for scalar instructions, which may be more time sensitive in some cases. Thus, performance of the processor pipeline 250 may be improved by performing fusion of vector instructions in the vector dispatch stage 262, after the vector instructions have been separated from the scalar instructions.

Performing fusion for vector instructions in the vector dispatch stage 262 may also simplify the detection of sequences of vector macro-ops that are candidates for fusion, where one or more intervening macro-ops occurring between the first macro-op and the second macro-op of the sequence of macro-ops in the program order are scalar macro-ops. These intervening scalar macro-ops may be sent to the scalar dispatch stage 258 of the processor pipeline 250 that operates in parallel with the vector dispatch stage 262. The absence of these intervening scalar macro-ops in the vector dispatch stage 262 may bring the first macro-op and the second macro-op closer together in an instruction queue (e.g., even making them consecutive within an instruction queue of the vector dispatch stage 262), thus making the sequence easier to detect.

Figure 2C:
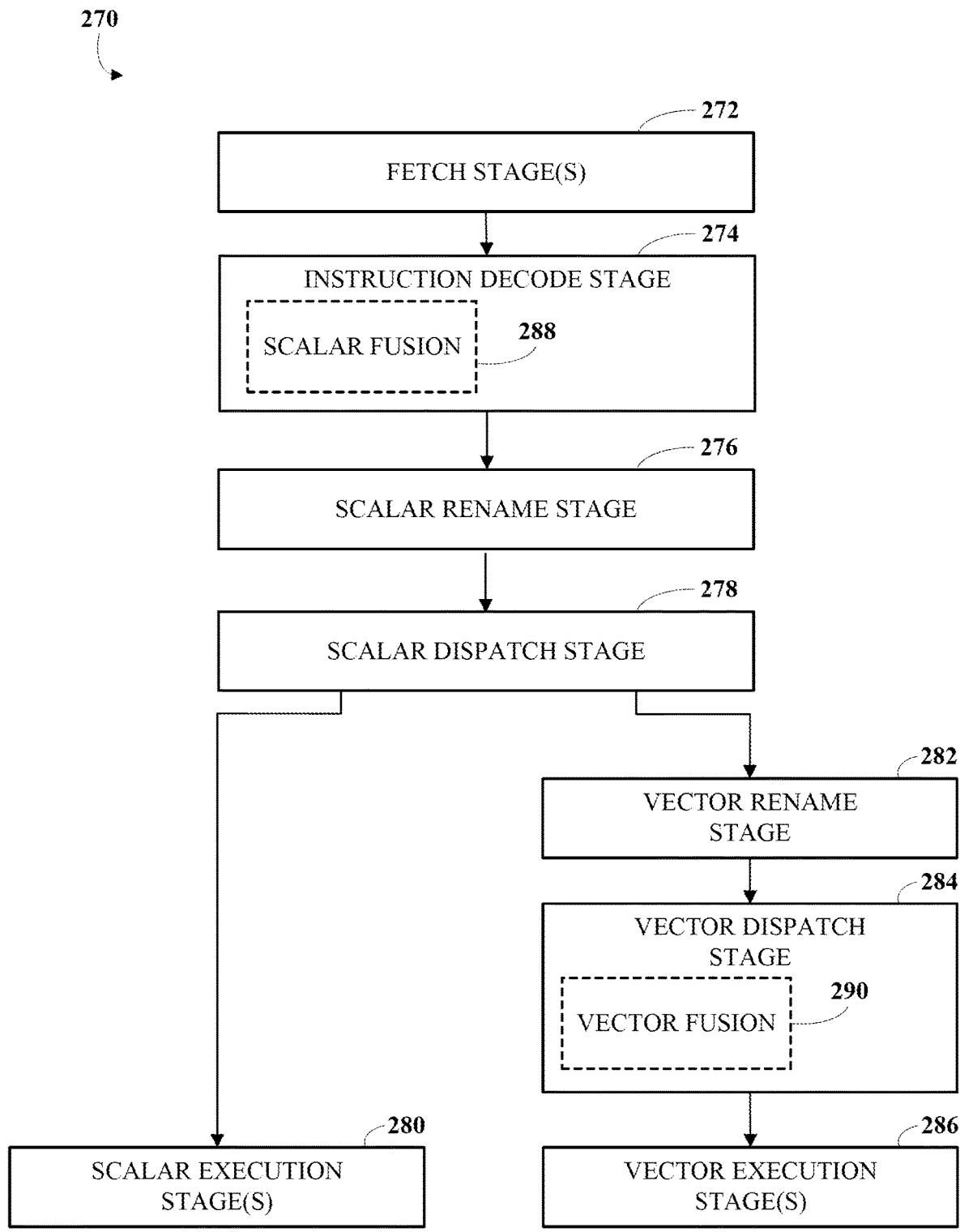
FIG. 2C is a block diagram of an example of a processor pipeline for fusion with destructive instructions.

FIG. 2C is a block diagram of an example of a processor pipeline 270 for fusion with destructive instructions. For example, the processor pipeline 270 may be implemented in an out-of-order machine. The processor pipeline 270 includes one or more fetch stages 272; an instruction decode stage 274; a scalar rename stage 276; a scalar dispatch stage 278; one or more scalar execution stages 280; a vector rename stage 282; a vector dispatch stage 284; and one or more vector execution stages 286. The vector dispatch stage 284 stores vector instructions received from the scalar dispatch stage 278. For example, the vector dispatch stage 284 may be implemented in a decoupled vector unit. The upstream stages (e.g., the instruction decode stage 274 and/or the scalar dispatch stage 278) in the processor pipeline 270 identify and segregate vector macro-ops as they pass through the processor pipeline 270 and forward them, via the vector rename stage 282, to the vector dispatch stage 284 to await dispatch to an appropriate vector execution stage 286. Scalar macro-ops and/or scalar micro-ops may be instead forwarded to an appropriate scalar execution stage 280. Macro-op fusion 288 may be applied to scalar instruction as they pass through the instruction decode stage 274, while vector macro-ops are passed to the vector dispatch stage 284. Macro-op fusion 290 may be applied to vector instructions as they pass through the vector dispatch stage 284. In some implementations, a fusion circuitry (e.g., the fusion circuitry 160) is configured to detect the sequence of macro-ops when the first macro-op and the second macro-op are stored in an instruction queue in the vector dispatch stage 284 of the processor pipeline 270. Performing the fusion in the vector dispatch stage 284 may take the fusion out of the critical path for scalar instructions, which may be more time sensitive in some cases. Thus, performance of the processor pipeline 270 may be improved by performing fusion of vector instructions in the vector dispatch stage 284, after the vector instructions have been separated from the scalar instructions.

Performing fusion for vector instructions in the vector dispatch stage 284 may also simplify the detection of sequences of vector macro-ops that are candidates for fusion, where one or more intervening macro-ops occurring between the first macro-op and the second macro-op of the sequence of macro-ops in the program order are scalar macro-ops. These intervening scalar macro-ops may be sent to the scalar execution stage 280 of the processor pipeline 270 that operates in parallel with the vector dispatch stage 284. The absence of these intervening scalar macro-ops in the vector dispatch stage 284 may bring the first macro-op and the second macro-op closer together in an instruction queue (e.g., even making them consecutive within an instruction queue of the vector dispatch stage 284), thus making the sequence easier to detect.

Figure 3:
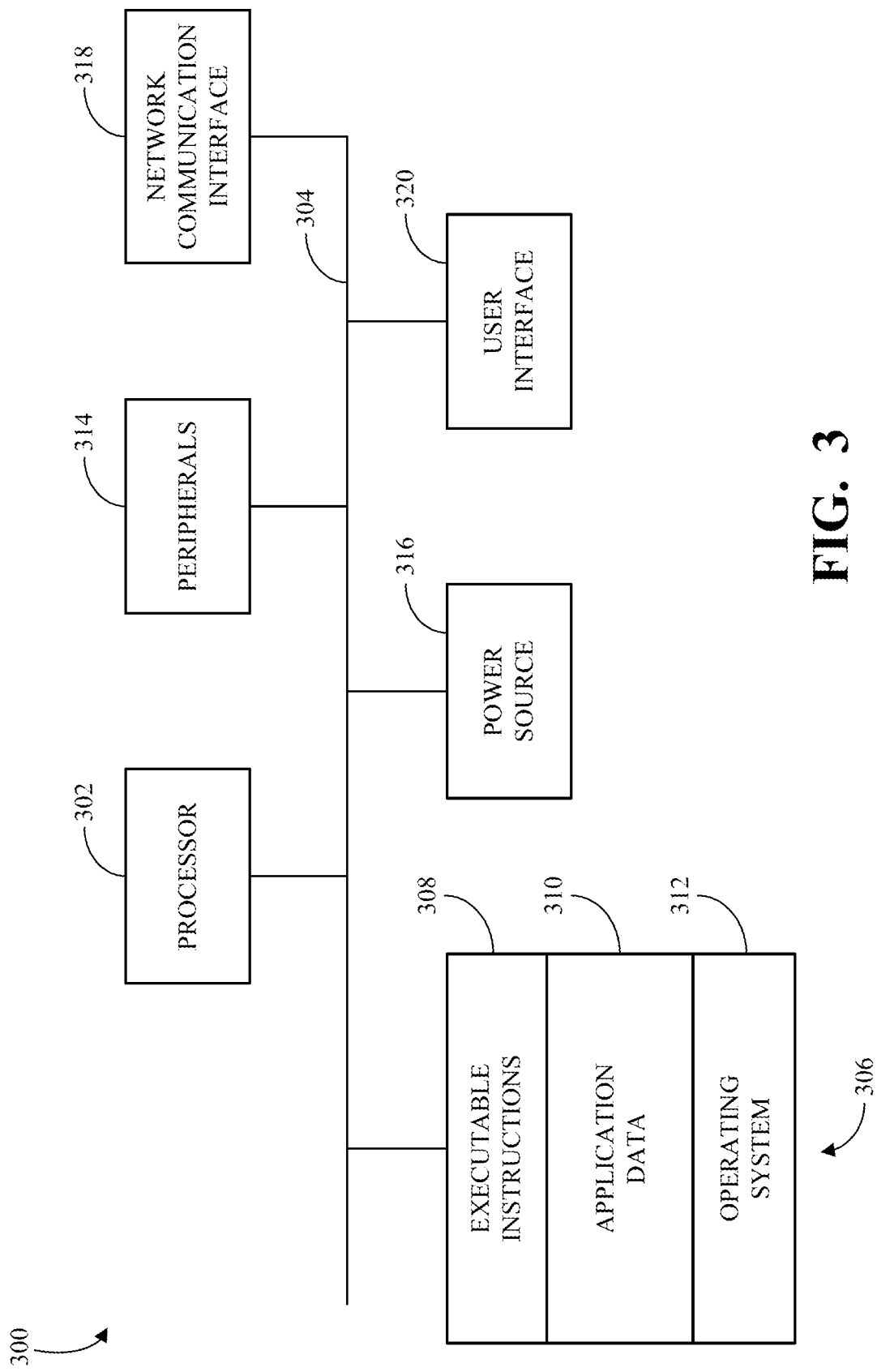
FIG. 3 is a block diagram of an example of a system for facilitating generation of a circuit representation.

FIG. 3 is a block diagram of an example of a system 300 for facilitating generation of a circuit representation, and/or for programming or manufacturing an integrated circuit. The system 300 is an example of an internal configuration of a computing device. For example, the system 300 may be used to generate a file that generates a circuit representation of an integrated circuit (e.g., the integrated circuit 110), including a processor core (e.g., the processor core 120) and a fusion circuitry (e.g., the fusion circuitry 160). The system 300 can include components or units, such as a processor 302, a bus 304, a memory 306, peripherals 314, a power source 316, a network communication interface 318, a user interface 320, other suitable components, or a combination thereof.

The processor 302 can be a central processing unit (CPU), such as a microprocessor, and can include single or multiple processors having single or multiple processing cores. Alternatively, the processor 302 can include another type of device, or multiple devices, now existing or hereafter developed, capable of manipulating or processing information. For example, the processor 302 can include multiple processors interconnected in any manner, including hardwired or networked, including wirelessly networked. In some implementations, the operations of the processor 302 can be distributed across multiple physical devices or units that can be coupled directly or across a local area or other suitable type of network. In some implementations, the processor 302 can include a cache, or cache memory, for local storage of operating data or instructions.

The memory 306 can include volatile memory, non-volatile memory, or a combination thereof. For example, the memory 306 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 306 can include another type of device, or multiple devices, now existing or hereafter developed, capable of storing data or instructions for processing by the processor 302. The processor 302 can access or manipulate data in the memory 306 via the bus 304. Although shown as a single block in FIG. 3, the memory 306 can be implemented as multiple units. For example, a system 300 can include volatile memory, such as random access memory (RAM), and persistent memory, such as a hard drive or other storage.

The memory 306 can include executable instructions 308, data, such as application data 310, an operating system 312, or a combination thereof, for immediate access by the processor 302. The executable instructions 308 can include, for example, one or more application programs, which can be loaded or copied, in whole or in part, from non-volatile memory to volatile memory to be executed by the processor 302. The executable instructions 308 can be organized into programmable modules or algorithms, functional programs, codes, code segments, or combinations thereof to perform various functions described herein. For example, the executable instructions 308 can include instructions executable by the processor 302 to cause the system 300 to automatically, in response to a command, generate an integrated circuit design and associated test results based on a design parameters data structure. The application data 310 can include, for example, user files, database catalogs or dictionaries, configuration information or functional programs, such as a web browser, a web server, a database server, or a combination thereof. The operating system 312 can be, for example, Microsoft Windows®, macOS®, or Linux®, an operating system for a small device, such as a smartphone or tablet device; or an operating system for a large device, such as a mainframe computer. The memory 306 can comprise one or more devices and can utilize one or more types of storage, such as solid-state or magnetic storage.

The peripherals 314 can be coupled to the processor 302 via the bus 304. The peripherals 314 can be sensors or detectors, or devices containing any number of sensors or detectors, which can monitor the system 300 itself or the environment around the system 300. For example, a system 300 can contain a temperature sensor for measuring temperatures of components of the system 300, such as the processor 302. Other sensors or detectors can be used with the system 300, as can be contemplated. In some implementations, the power source 316 can be a battery, and the system 300 can operate independently of an external power distribution system. Any of the components of the system 300, such as the peripherals 314 or the power source 316, can communicate with the processor 302 via the bus 304.

The network communication interface 318 can also be coupled to the processor 302 via the bus 304. In some implementations, the network communication interface 318 can comprise one or more transceivers. The network communication interface 318 can, for example, provide a connection or link to a network, via a network interface, which can be a wired network interface, such as Ethernet, or a wireless network interface. For example, the system 300 can communicate with other devices via the network communication interface 318 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 320 can include a display; a positional input device, such as a mouse, touchpad, touchscreen, or the like; a keyboard; or other suitable human or machine interface devices. The user interface 320 can be coupled to the processor 302 via the bus 304. Other interface devices that permit a user to program or otherwise use the system 300 can be provided in addition to or as an alternative to a display. In some implementations, the user interface 320 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 314. The operations of the processor 302 can be distributed across multiple clients or servers, which can be coupled directly or across a local area or other suitable type of network. The memory 306 can be distributed across multiple clients or servers, such as network-based memory or memory in multiple clients or servers performing the operations of clients or servers. Although depicted here as a single bus, the bus 304 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 4:
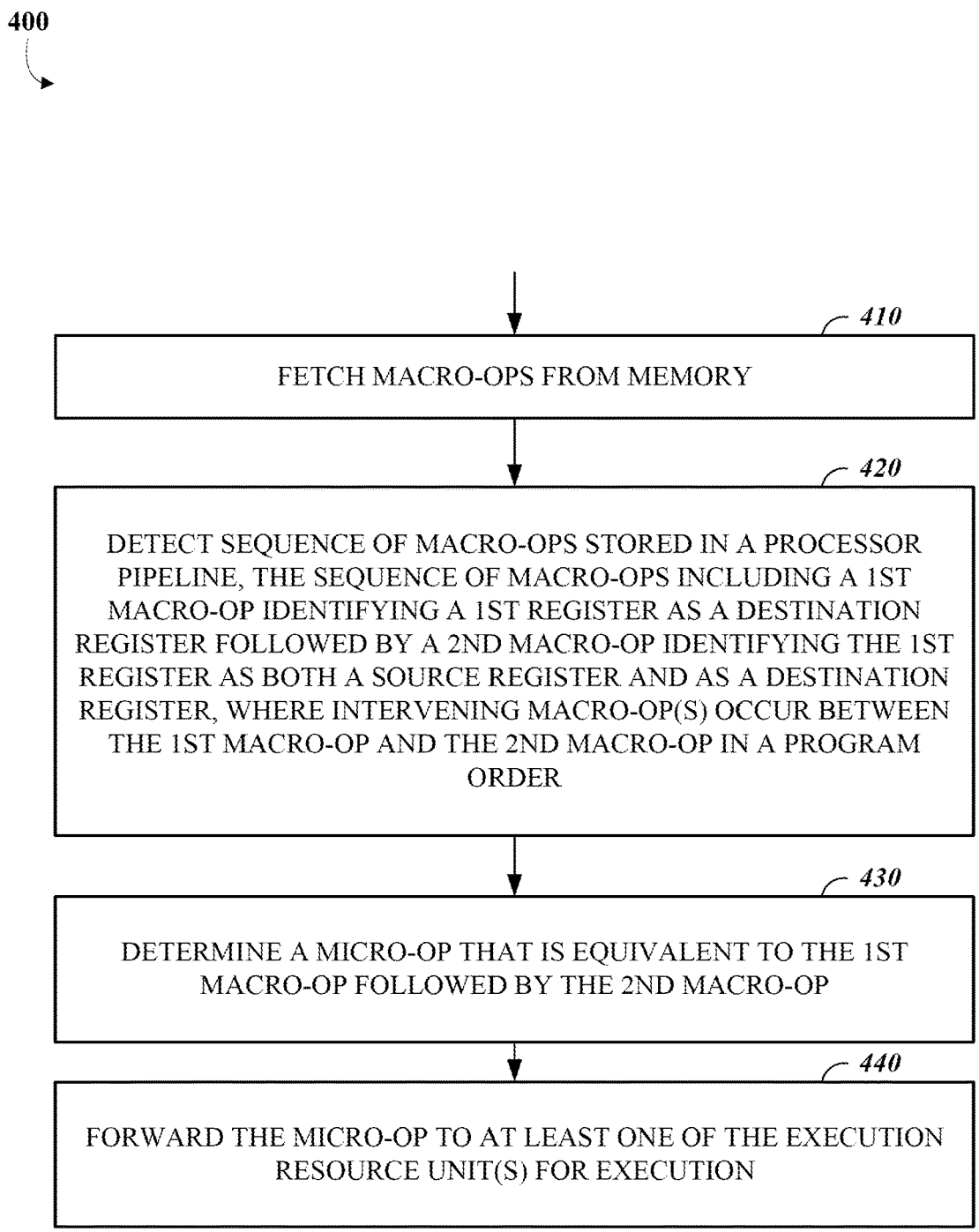
FIG. 4 is a flow chart of an example of a process for fusion with destructive instructions.

FIG. 4 is a flow chart of an example of a process 400 for fusion with destructive instructions. The process 400 includes fetching 410 macro-ops from memory; detecting 420 a sequence of macro-ops stored in a processor pipeline of a processor core, the sequence of macro-ops including a first macro-op identifying a first register as a destination register followed by a second macro-op identifying the first register as both a source register and as a destination register; determining 430 a micro-op that is equivalent to the first macro-op followed by the second macro-op; and forwarding 440 the micro-op to at least one of one or more execution resource circuitries of the processor core for execution. One or more intervening macro-ops may occur between the first macro-op and the second macro-op in a program order used to fetch 410 macro-ops from memory. For example, the process 400 may be implemented using the integrated circuit 110 of FIG. 1.

The process 400 includes fetching 410 macro-ops from memory. The macro-ops may be stored in one or more instruction queues (e.g., the instruction queue 162) as they progress through a processor pipeline (e.g., the processor pipeline 200). For example, the instruction queue may have a depth (e.g., 4, 8, 12, 16, or 24 instructions) that facilitates a pipelined and/or superscalar architecture of an integrated circuit (e.g., a processor or a microcontroller). The macro-ops may be members of an instruction set (e.g., a RISC-V instruction set, an x86 instruction set, an ARM instruction set, or a MIPS instruction set) supported by the integrated circuit.

The process 400 includes detecting 420 a sequence of macro-ops stored in a processor pipeline of a processor core (e.g., the processor pipeline 122), the sequence of macro-ops including a first macro-op identifying a first register as a destination register followed by a second macro-op identifying the first register as both a source register and as a destination register. One or more intervening macro-ops occur between the first macro-op and the second macro-op in a program order used to fetch 410 macro-ops from memory. In some implementations, the first macro-op is a vector instruction, the second macro-op is a vector instruction, and the first register is a vector register. For example, the one or more intervening macro-ops may be one or more scalar instructions. In some implementations, the sequence of macro-ops is detected 420 when the first macro-op and the second macro-op are stored in an instruction queue in a vector dispatch stage of the processor pipeline, and the one or more intervening macro-ops are sent to a scalar dispatch stage of the processor pipeline that operates in parallel with the vector dispatch stage. For example, the first macro-op may be a stand-alone instruction that can be executed independently of the second macro-op.

Checks on the sequence of macro-ops may be performed to confirm that it is a viable candidate for fusion. In some implementations, vector length is a dynamically configurable parameter of the processor core and detecting 420 the sequence of macro-ops may include checking that the first macro-op and second macro-op have a same vector length as a condition for determining the micro-op. In some implementations, detecting 420 the sequence of macro-ops may include checking that the first macro-op and second macro-op have a same mask argument as a condition for determining the micro-op. For example, detecting 420 the sequence of macro-ops may include implementing the process 600 of FIG. 6.

The process 400 includes determining 430 a micro-op that is equivalent to the first macro-op followed by the second macro-op. These forms of fusion may be applied to a variety of sequences of instructions meeting a criteria. For example, the conditions for fusion of the first macro-op followed by the second macro-op may include: (1) both instructions have a same active vector length; (2) both instructions have the same masking control, either both unmasked or both have same mask register argument; and (3) The first instruction writes the destructive operand of second instruction. In some implementations, the first macro-op is a vector move instruction and the second macro-op is a destructive vector multiply accumulate instruction. For example, the sequence of RISC-V macro-ops:

Vmv.v vd, va #Vd=va
Vfmacc.vv vd, vb, vc, #Vd+=vb*vc may be fused into a micro-op:

Vfmadd.vv vd, va, vb, vc #vd=va+vb*vc

In some implementations, the first macro-op is a masked vector merge instruction and the second macro-op is a destructive vector multiply accumulate instruction. For example, the sequence of RISC-V macro-ops:

Vmerge.vv vd, va, vd, vm #vd[i]=if (vm[i]) va[i] else vd[i]
Vfmacc.vv vd, vb, vc, vm #vd[i]=if (vm[i]) (vd[i]+vb[i]*vc[i]) else vd[i]

may be fused into a micro-op:

Vfmadd.vvv vd, va, vb, vc, vm #vd[i]=if (vm[i]) (va[i]+vb[i]*vc[i]) else vd[i]

In some implementations, the first macro-op is a scalar-to-vector move instruction and the second macro-op is a destructive vector multiply accumulate instruction. For example, the sequence of RISC-V macro-ops:

Vmv.v.f vd, fa #vd[i]=fa for all i
Vfmacc.vv vd, vb, vc #vd[i]=vd[i]+vb[i]*vc[i]

may be fused into a micro-op:

Vfmacc.vvf vd, fa, vb, vc #vd[i]=fa+vb[i]*vc[i]

For example, one or more of the execution resource circuitries of the processor core may be configured to execute these micro-ops resulting from fusion.

The process 400 includes forwarding 440 the micro-op to at least one of one or more execution resource circuitries of the processor core for execution. For example, the micro-op may be forwarded 440 directly to an execution resource circuitry or may be forwarded 440 to the execution resource circuitry via one or more intervening stages (e.g., through an issue stage and/or a register rename stage) of the processor pipeline. The at least one execution resource circuitry (e.g., 140, 142, 144, and/or 146 of FIG. 1) may be configured to execute micro-ops to support an instruction set including macro-ops. For example, the instruction set may be a RISC-V instruction set. For example, the at least one execution resource circuitry may include an adder, a shift register, a multiplier, and/or a floating-point unit. The at least one execution resource circuitry may update the state of an integrated circuit (e.g., a processor or microcontroller) that is implementing the process 400, including internal registers and/or flags or status bits based on results of executing a micro-op. Results of execution of a micro-op may also be written to the memory.

Figure 5:
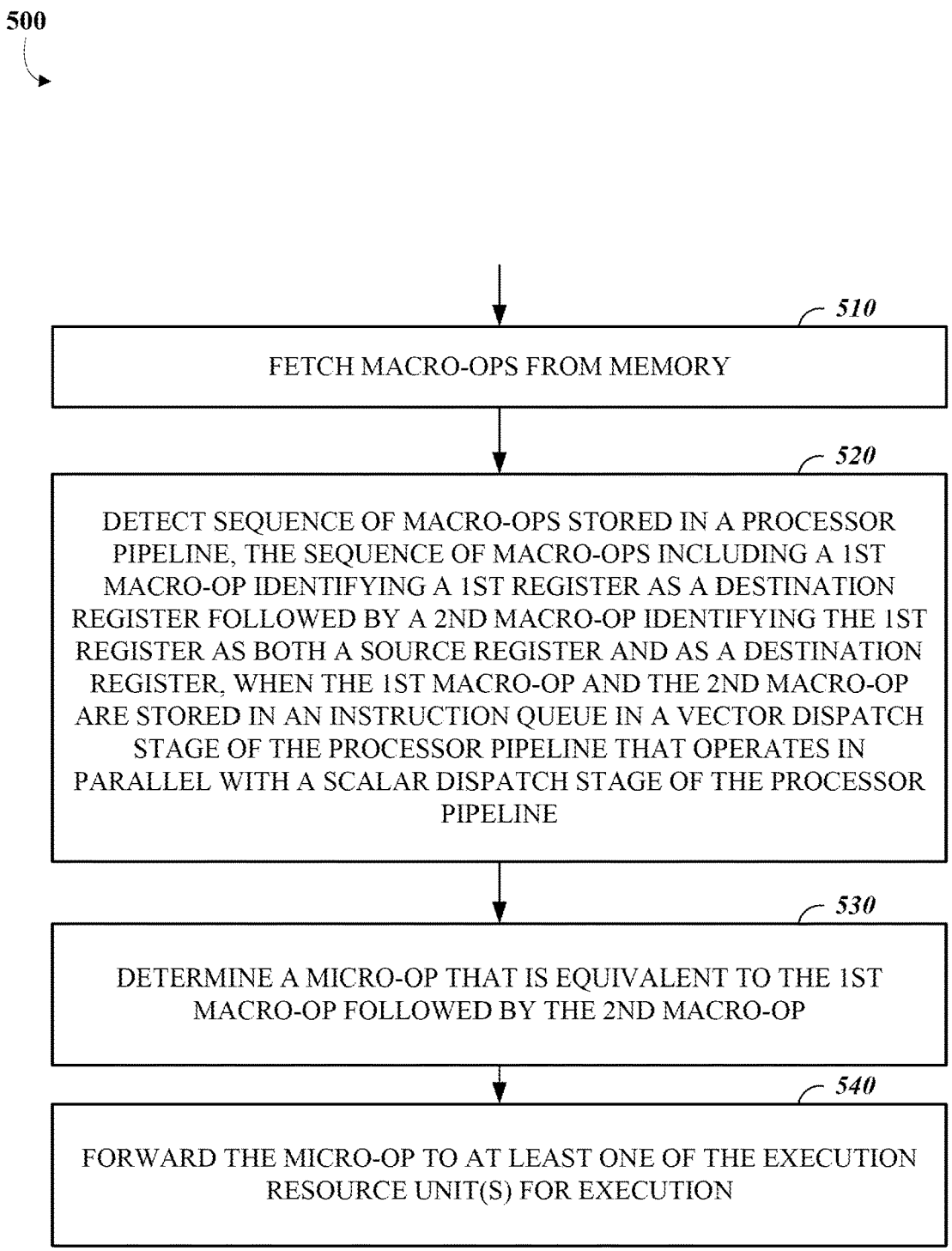
FIG. 5 is a flow chart of an example of a process for fusion with destructive instructions in a pipeline with a vector dispatch stage in parallel with a scalar dispatch stage.

FIG. 5 is a flow chart of an example of a process 500 for fusion with destructive instructions in a pipeline with a vector dispatch stage in parallel with a scalar dispatch stage. The process 500 includes fetching 510 macro-ops from memory; detecting 520 a sequence of macro-ops stored in a processor pipeline of a processor core, the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor; determining 530 a micro-op that is equivalent to the first macro-op followed by the second macro-op; and forwarding 540 the micro-op to at least one of one or more execution resource circuitries of the processor core for execution. For example, the process 500 may be implemented using the integrated circuit 110 of FIG. 1.

The process 500 includes fetching 510 macro-ops from memory. The macro-ops may be stored in one or more instruction queues (e.g., the instruction queue 162) as they progress through a processor pipeline (e.g., the processor pipeline 200). For example, the instruction queue may have a depth (e.g., 5, 8, 12, 16, or 24 instructions) that facilitates a pipelined and/or superscalar architecture of an integrated circuit (e.g., a processor or a microcontroller). The macro-ops may be members of an instruction set (e.g., a RISC-V instruction set, an x86 instruction set, an ARM instruction set, or a MIPS instruction set) supported by the integrated circuit.

The process 500 includes detecting 520 a sequence of macro-ops stored in a processor pipeline of a processor core (e.g., the processor core 120), the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor pipeline that operates in parallel with a scalar dispatch stage of the processor pipeline (e.g., the processor pipeline 200). In some implementations, the first macro-op is a vector instruction, the second macro-op is a vector instruction, and the first register is a vector register. For example, the first macro-op may be a stand-alone instruction that can be executed independently of the second macro-op.

Checks on the sequence of macro-ops may be performed to confirm that it is a viable candidate for fusion. In some implementations, vector length is a dynamically configurable parameter of the processor core and detecting 520 the sequence of macro-ops may include checking that the first macro-op and second macro-op have a same vector length as a condition for determining the micro-op. In some implementations, detecting 520 the sequence of macro-ops may include checking that the first macro-op and second macro-op have a same mask argument as a condition for determining the micro-op. For example, detecting 520 the sequence of macro-ops may include implementing the process 600 of FIG. 6.

The process 500 includes determining 530 a micro-op that is equivalent to the first macro-op followed by the second macro-op. These forms of fusion may be applied to a variety of sequences of instructions meeting a criteria. For example, the conditions for fusion of the first macro-op followed by the second macro-op may include: (1) both instructions have a same active vector length; (2) both instructions have the same masking control, either both unmasked or both have same mask register argument; and (3) The first instruction writes the destructive operand of second instruction. In some implementations, the first macro-op is a vector move instruction and the second macro-op is a destructive vector multiply accumulate instruction. For example, the sequence of RISC-V macro-ops:

Vmv.v vd, va #Vd=va
Vfmacc.vv vd, vb, vc, #Vd+=vb*vc may be fused into a micro-op:

Vfmadd.vv vd, va, vb, vc #vd=va+vb*vc

In some implementations, the first macro-op is a masked vector merge instruction and the second macro-op is a destructive vector multiply accumulate instruction. For example, the sequence of RISC-V macro-ops:

Vmerge.vv vd, va, vd, vm #vd[i]=if (vm[i]) va[i] else vd[i]
Vfmacc.vv vd, vb, vc, vm #vd[i]=if (vm[i]) (vd[i]+vb[i]*vc[i]) else vd[i]

may be fused into a micro-op:

Vfmadd.vvv vd, va, vb, vc, vm #vd[i]=if (vm[i]) (va[i]+vb[i]*vc[i]) else vd[i]

In some implementations, the first macro-op is a scalar-to-vector move instruction and the second macro-op is a destructive vector multiply accumulate instruction. For example, the sequence of RISC-V macro-ops:

Vmv.v.f vd, fa #vd[i]=fa for all i
Vfmacc.vv vd, vb, vc #vd[i]=vd[i]+vb[i]*vc[i]

may be fused into a micro-op:

Vfmacc.vvf vd, fa, vb, vc #vd[i]=fa+vb[i]*vc[i]

For example, one or more of the execution resource circuitries of the processor core may be configured to execute these micro-ops resulting from fusion.

The process 500 includes forwarding 540 the micro-op to at least one of one or more execution resource circuitries of the processor core for execution. For example, the micro-op may be forwarded 540 directly to an execution resource circuitry or may be forwarded 540 to the execution resource circuitry via one or more intervening stages (e.g., through an issue stage and/or a register rename stage) of the processor pipeline. The at least one execution resource circuitry (e.g., 140, 142, 144, and/or 146 of FIG. 1) may be configured to execute micro-ops to support an instruction set including macro-ops. For example, the instruction set may be a RISC-V instruction set. For example, the at least one execution resource circuitry may include an adder, a shift register, a multiplier, and/or a floating point unit. The at least one execution resource circuitry may update the state of an integrated circuit (e.g., a processor or microcontroller) that is implementing the process 500, including internal registers and/or flags or status bits based on results of executing a micro-op. Results of execution of a micro-op may also be written to the memory.

Figure 6:
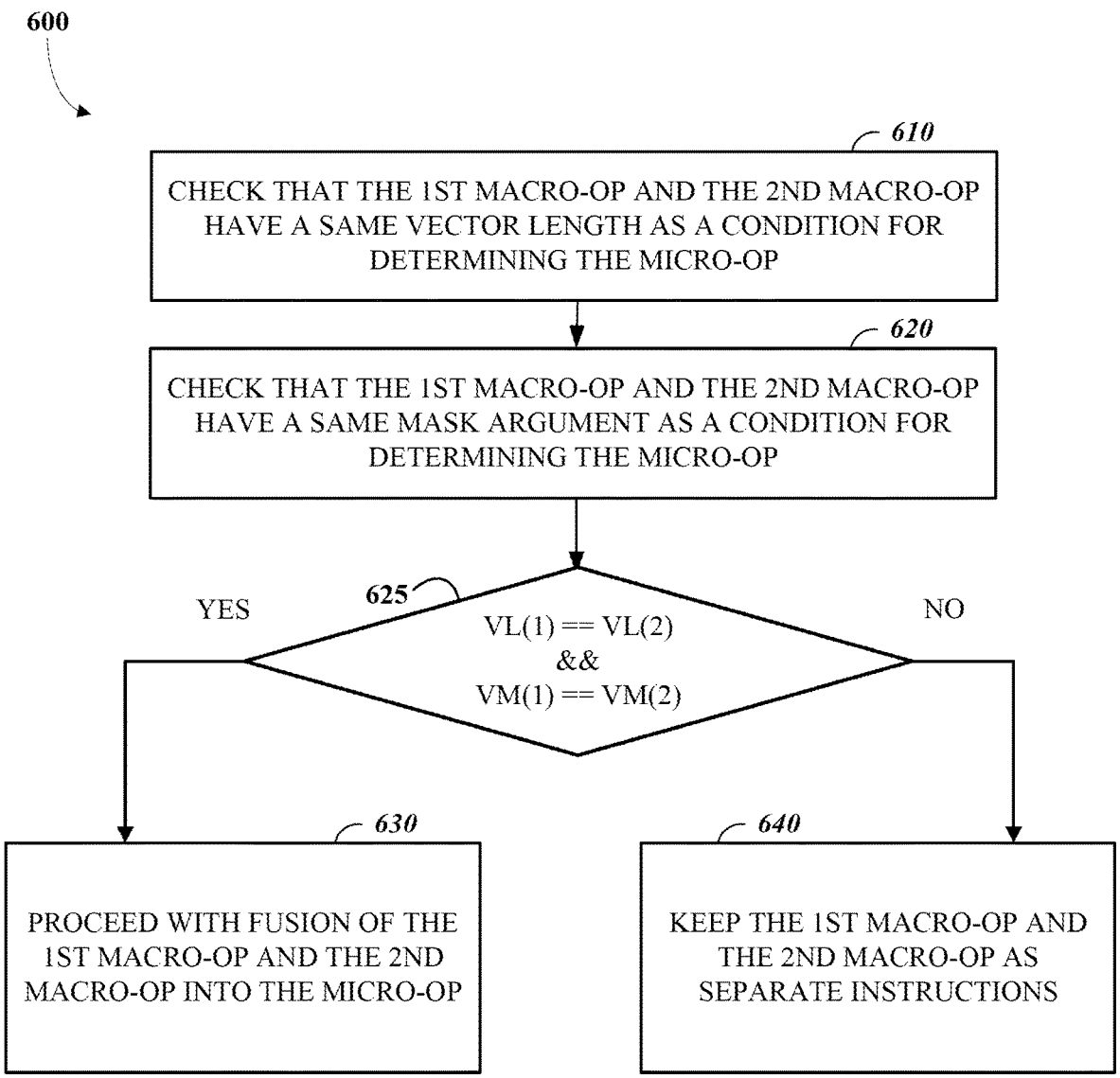
FIG. 6 is a flow chart of an example of a process for checking whether conditions for macro-op fusion are satisfied.

FIG. 6 is a flow chart of an example of a process 600 for checking whether conditions for macro-op fusion are satisfied. Vector length may be a dynamically configurable parameter of a processor core (e.g., the processor core 120). The process 600 includes checking 610 that the first macro-op and second macro-op have a same vector length as a condition for determining the micro-op; and checking 620 that the first macro-op and second macro-op have a same mask argument as a condition for determining the micro-op. At 625, if the vector lengths are the same and the mask arguments are the same, then proceeding 630 with fusion of the first macro-op and the second macro-op. At 625, if the vector lengths are different or the mask arguments are different, then keeping 640 the first macro-op and the second macro-op as separate instructions. For example, the process 600 may be implemented using the integrated circuit 110 of FIG. 1.

The process 600 includes checking 610 that the first macro-op and second macro-op have a same vector length as a condition for determining the micro-op. For example, an instruction to change the active vector length parameter for the processor core may occur between the first macro-op and the second macro-op in the program order, which would make them have different vector length parameter. For example, the applicable vector length parameter for a vector instruction may be resolved by the time the instruction enters a vector dispatch stage of a processor pipeline (e.g., the processor pipeline 200), which enables the vector length parameters for macro-ops in an instruction queue in the vector dispatch stage to be readily compared.

The process 600 includes checking 620 that the first macro-op and second macro-op have a same mask argument as a condition for determining the micro-op. The mask register operand is a function of the instruction encoding, so it is known when the instruction enters the vector queue. This enables checking 620 that both instructions read the same mask register or both instructions are unmasked.

In a first aspect, the subject matter described in this specification can be embodied in an integrated circuit for executing instructions that includes a memory system; a processor core including a one or more execution resource circuitries configured to execute micro-ops to support an instruction set architecture including macro-ops, wherein the processor core is configured to fetch macro-ops from the memory system in a program order; and a fusion circuitry that is configured to: detect a sequence of macro-ops stored in a processor pipeline of the processor core, the sequence of macro-ops including a first macro-op identifying a first register as a destination register followed by a second macro-op identifying the first register as both a source register and as a destination register, wherein one or more intervening macro-ops occur between the first macro-op and the second macro-op in the program order; determine a micro-op that is equivalent to the first macro-op followed by the second macro-op; and forward the micro-op to at least one of the one or more execution resource circuitries for execution.

In the first aspect, the first macro-op may be a vector instruction, the second macro-op may be a vector instruction, and the first register may be a vector register of the instruction set architecture. In the first aspect, the one or more intervening macro-ops may be one or more scalar instructions of the instruction set architecture. In the first aspect, the fusion circuitry may be configured to detect the sequence of macro-ops when the first macro-op and the second macro-op are stored in an instruction queue in a vector dispatch stage of the processor pipeline, and the one or more intervening macro-ops may be sent to a scalar dispatch stage of the processor pipeline that operates in parallel with the vector dispatch stage. In the first aspect, the first macro-op may be a stand-alone instruction that can be executed independently of the second macro-op. In the first aspect, vector length may be a dynamically configurable parameter of the processor core and the fusion circuitry may be configured to check that the first macro-op and second macro-op have a same vector length as a condition for determining the micro-op. In the first aspect, the fusion circuitry may be configured to check that the first macro-op and second macro-op have a same mask argument as a condition for determining the micro-op. In the first aspect, the first macro-op may be a vector move instruction and the second macro-op may be a destructive vector multiply accumulate instruction. In the first aspect, the first macro-op may be a masked vector merge instruction and the second macro-op may be a destructive vector multiply accumulate instruction. In the first aspect, the first macro-op may be a scalar-to-vector move instruction and the second macro-op may be a destructive vector multiply accumulate instruction. In the first aspect, the processor core may be an in-order machine. In the first aspect, the processor core may be an out-of-order machine that includes an internal in-order decoupled vector queue, and the fusion circuitry may be configured to detect the sequence of macro-ops when dispatching vector instructions to reservation stations. In the first aspect, the instruction set architecture may be a RISC-V instruction set architecture.

In a second aspect, the subject matter described in this specification can be embodied in methods that include detecting a sequence of macro-ops stored in a processor pipeline of a processor core, the sequence of macro-ops including a first macro-op identifying a first register as a destination register followed by a second macro-op identifying the first register as both a source register and as a destination register, wherein one or more intervening macro-ops occur between the first macro-op and the second macro-op in a program order used to fetch macro-ops from memory; determining a micro-op that is equivalent to the first macro-op followed by the second macro-op; and forwarding the micro-op to at least one of one or more execution resource circuitries of the processor core for execution.

In the second aspect, the first macro-op may be a vector instruction, the second macro-op may be a vector instruction, and the first register may be a vector register. In the second aspect, the one or more intervening macro-ops may be one or more scalar instructions. In the second aspect, the sequence of macro-ops may be detected when the first macro-op and the second macro-op are stored in an instruction queue in a vector dispatch stage of the processor pipeline, and the one or more intervening macro-ops may be sent to a scalar dispatch stage of the processor pipeline that operates in parallel with the vector dispatch stage. In the second aspect, the first macro-op may be a stand-alone instruction that can be executed independently of the second macro-op. In the second aspect, vector length may be a dynamically configurable parameter of the processor core, and the methods may include checking that the first macro-op and second macro-op have a same vector length as a condition for determining the micro-op. In the second aspect, the methods may include checking that the first macro-op and second macro-op have a same mask argument as a condition for determining the micro-op. In the second aspect, the first macro-op may be a vector move instruction and the second macro-op may be a destructive vector multiply accumulate instruction. In the second aspect, the first macro-op may be a masked vector merge instruction and the second macro-op may be a destructive vector multiply accumulate instruction. In the second aspect, the first macro-op may be a scalar-to-vector move instruction and the second macro-op may be a destructive vector multiply accumulate instruction.

In a third aspect, the subject matter described in this specification can be embodied in a non-transitory computer readable medium comprising a circuit representation that, when processed by a computer, is used to program or manufacture an integrated circuit that includes a memory system; a processor core including a one or more execution resource circuitries configured to execute micro-ops to support an instruction set architecture including macro-ops, wherein the processor core is configured to fetch macro-ops from the memory system in a program order; and a fusion circuitry that is configured to: detect a sequence of macro-ops stored in a processor pipeline of the processor core, the sequence of macro-ops including a first macro-op identifying a first register as a destination register followed by a second macro-op identifying the first register as both a source register and as a destination register, wherein one or more intervening macro-ops occur between the first macro-op and the second macro-op in the program order; determine a micro-op that is equivalent to the first macro-op followed by the second macro-op; and forward the micro-op to at least one of the one or more execution resource circuitries for execution.

In the third aspect, the first macro-op may be a vector instruction, the second macro-op may be a vector instruction, and the first register may be a vector register of the instruction set architecture. In the third aspect, the one or more intervening macro-ops may be one or more scalar instructions of the instruction set architecture. In the third aspect, the fusion circuitry may be configured to detect the sequence of macro-ops when the first macro-op and the second macro-op are stored in an instruction queue in a vector dispatch stage of the processor pipeline, and the one or more intervening macro-ops may be sent to a scalar dispatch stage of the processor pipeline that operates in parallel with the vector dispatch stage. In the third aspect, the first macro-op may be a stand-alone instruction that can be executed independently of the second macro-op. In the third aspect, vector length may be a dynamically configurable parameter of the processor core and the fusion circuitry may be configured to check that the first macro-op and second macro-op have a same vector length as a condition for determining the micro-op. In the third aspect, the fusion circuitry may be configured to check that the first macro-op and second macro-op have a same mask argument as a condition for determining the micro-op. In the third aspect, the first macro-op may be a vector move instruction and the second macro-op may be a destructive vector multiply accumulate instruction. In the third aspect, the first macro-op may be a masked vector merge instruction and the second macro-op may be a destructive vector multiply accumulate instruction. In the third aspect, the first macro-op may be a scalar-to-vector move instruction and the second macro-op may be a destructive vector multiply accumulate instruction. In the third aspect, the processor core may be an in-order machine. In the third aspect, the processor core may be an out-of-order machine that includes an internal in-order decoupled vector queue, and the fusion circuitry may be configured to detect the sequence of macro-ops when dispatching vector instructions to reservation stations. In the third aspect, the instruction set architecture may be a RISC-V instruction set architecture.

In a fourth aspect, the subject matter described in this specification can be embodied in an integrated circuit for executing instructions that includes a memory system; a processor core including a one or more execution resource circuitries configured to execute micro-ops to support an instruction set architecture including macro-ops, wherein the processor core is configured to fetch macro-ops from the memory system in a program order; and a fusion circuitry that is configured to: detect a sequence of macro-ops stored in a processor pipeline of the processor core, the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor pipeline that operates in parallel with a scalar dispatch stage of the processor pipeline; determine a micro-op that is equivalent to the first macro-op followed by the second macro-op; and forward the micro-op to at least one of the one or more execution resource circuitries for execution.

In the fourth aspect, the first macro-op may be a vector instruction, the second macro-op may be a vector instruction, and the first register may be a vector register of the instruction set architecture. In the fourth aspect, the first macro-op may be a stand-alone instruction that can be executed independently of the second macro-op. In the fourth aspect, vector length may be a dynamically configurable parameter of the processor core and the fusion circuitry may be configured to check that the first macro-op and second macro-op have a same vector length as a condition for determining the micro-op. In the fourth aspect, the fusion circuitry may be configured to check that the first macro-op and second macro-op have a same mask argument as a condition for determining the micro-op. In the fourth aspect, the first macro-op may be a vector move instruction and the second macro-op may be a destructive vector multiply accumulate instruction. In the fourth aspect, the first macro-op may be a masked vector merge instruction and the second macro-op may be a destructive vector multiply accumulate instruction. In the fourth aspect, the first macro-op may be a scalar-to-vector move instruction and the second macro-op may be a destructive vector multiply accumulate instruction. In the fourth aspect, the processor core may be an in-order machine. In the fourth aspect, the processor core may be an out-of-order machine that includes an internal in-order decoupled vector queue, and the fusion circuitry may be configured to detect the sequence of macro-ops when dispatching vector instructions to reservation stations. In the fourth aspect, the instruction set architecture may be a RISC-V instruction set architecture.

In a fifth aspect, the subject matter described in this specification can be embodied in methods that include detecting a sequence of macro-ops stored in a processor pipeline of a processor core, the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor pipeline that operates in parallel with a scalar dispatch stage of the processor pipeline; determining a micro-op that is equivalent to the first macro-op followed by the second macro-op; and forwarding the micro-op to at least one of one or more execution resource circuitries of the processor core for execution.

In the fifth aspect, the first macro-op may be a vector instruction, the second macro-op may be a vector instruction, and the first register may be a vector register. In the fifth aspect, the first macro-op may be a stand-alone instruction that can be executed independently of the second macro-op. In the fifth aspect, vector length may be a dynamically configurable parameter of the processor core, and the methods may include checking that the first macro-op and second macro-op have a same vector length as a condition for determining the micro-op. In the fifth aspect, the methods may include checking that the first macro-op and second macro-op have a same mask argument as a condition for determining the micro-op. In the fifth aspect, the first macro-op may be a vector move instruction and the second macro-op may be a destructive vector multiply accumulate instruction. In the fifth aspect, the first macro-op may be a masked vector merge instruction and the second macro-op may be a destructive vector multiply accumulate instruction. In the fifth aspect, the first macro-op may be a scalar-to-vector move instruction and the second macro-op may be a destructive vector multiply accumulate instruction.

In a sixth aspect, the subject matter described in this specification can be embodied in a non-transitory computer readable medium comprising a circuit representation that, when processed by a computer, is used to program or manufacture an integrated circuit that includes a memory system; a processor core including a one or more execution resource circuitries configured to execute micro-ops to support an instruction set architecture including macro-ops, wherein the processor core is configured to fetch macro-ops from the memory system in a program order; and a fusion circuitry that is configured to: detect a sequence of macro-ops stored in a processor pipeline of the processor core, the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor pipeline that operates in parallel with a scalar dispatch stage of the processor pipeline; determine a micro-op that is equivalent to the first macro-op followed by the second macro-op; and forward the micro-op to at least one of the one or more execution resource circuitries for execution.

In the sixth aspect, the first macro-op may be a vector instruction, the second macro-op may be a vector instruction, and the first register may be a vector register of the instruction set architecture. In the sixth aspect, the first macro-op may be a stand-alone instruction that can be executed independently of the second macro-op. In the sixth aspect, vector length may be a dynamically configurable parameter of the processor core and the fusion circuitry may be configured to check that the first macro-op and second macro-op have a same vector length as a condition for determining the micro-op. In the sixth aspect, the fusion circuitry may be configured to check that the first macro-op and second macro-op have a same mask argument as a condition for determining the micro-op. In the sixth aspect, the first macro-op may be a vector move instruction and the second macro-op may be a destructive vector multiply accumulate instruction. In the sixth aspect, the first macro-op may be a masked vector merge instruction and the second macro-op may be a destructive vector multiply accumulate instruction. In the sixth aspect, the first macro-op may be a scalar-to-vector move instruction and the second macro-op may be a destructive vector multiply accumulate instruction. In the sixth aspect, the processor core may be an in-order machine. In the sixth aspect, the processor core may be an out-of-order machine that includes an internal in-order decoupled vector queue, and the fusion circuitry may be configured to detect the sequence of macro-ops when dispatching vector instructions to reservation stations. In the sixth aspect, the instruction set architecture may be a RISC-V instruction set architecture.

In a seventh aspect, the subject matter described in this specification can be embodied in an integrated circuit for executing instructions that includes a memory system; a processor core including a one or more execution resource circuitries configured to execute micro-ops to support an instruction set architecture including macro-ops, wherein the processor core is configured to fetch macro-ops from the memory system in a program order; and a fusion circuitry that is configured to: detect a sequence of macro-ops stored in a processor pipeline of the processor core, the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor pipeline that stores vector instructions received from a scalar dispatch stage of the processor pipeline; determine a micro-op that is equivalent to the first macro-op followed by the second macro-op; and forward the micro-op to at least one of the one or more execution resource circuitries for execution.

In the seventh aspect, the first macro-op may be a vector instruction, the second macro-op may be a vector instruction, and the first register may be a vector register of the instruction set architecture. In the seventh aspect, the first macro-op may be a stand-alone instruction that can be executed independently of the second macro-op. In the seventh aspect, vector length may be a dynamically configurable parameter of the processor core and the fusion circuitry may be configured to check that the first macro-op and second macro-op have a same vector length as a condition for determining the micro-op. In the seventh aspect, the fusion circuitry may be configured to check that the first macro-op and second macro-op have a same mask argument as a condition for determining the micro-op. In the seventh aspect, the first macro-op may be a vector move instruction and the second macro-op may be a destructive vector multiply accumulate instruction. In the seventh aspect, the first macro-op may be a masked vector merge instruction and the second macro-op may be a destructive vector multiply accumulate instruction. In the seventh aspect, the first macro-op may be a scalar-to-vector move instruction and the second macro-op may be a destructive vector multiply accumulate instruction. In the seventh aspect, the processor core may be an in-order machine. In the seventh aspect, the processor core may be an out-of-order machine that includes an internal in-order decoupled vector queue, and the fusion circuitry may be configured to detect the sequence of macro-ops when dispatching vector instructions to reservation stations. In the seventh aspect, the instruction set architecture may be a RISC-V instruction set architecture.

In an eighth aspect, the subject matter described in this specification can be embodied in methods that include detecting a sequence of macro-ops stored in a processor pipeline of a processor core, the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor pipeline that stores vector instructions received from a scalar dispatch stage of the processor pipeline; determining a micro-op that is equivalent to the first macro-op followed by the second macro-op; and forwarding the micro-op to at least one of one or more execution resource circuitries of the processor core for execution.

In the eighth aspect, the first macro-op may be a vector instruction, the second macro-op may be a vector instruction, and the first register may be a vector register. In the eighth aspect, the first macro-op may be a stand-alone instruction that can be executed independently of the second macro-op. In the eighth aspect, vector length may be a dynamically configurable parameter of the processor core, and the methods may include checking that the first macro-op and second macro-op have a same vector length as a condition for determining the micro-op. In the eighth aspect, the methods may include checking that the first macro-op and second macro-op have a same mask argument as a condition for determining the micro-op. In the eighth aspect, the first macro-op may be a vector move instruction and the second macro-op may be a destructive vector multiply accumulate instruction. In the eighth aspect, the first macro-op may be a masked vector merge instruction and the second macro-op may be a destructive vector multiply accumulate instruction. In the eighth aspect, the first macro-op may be a scalar-to-vector move instruction and the second macro-op may be a destructive vector multiply accumulate instruction.

In a ninth aspect, the subject matter described in this specification can be embodied in a non-transitory computer readable medium comprising a circuit representation that, when processed by a computer, is used to program or manufacture an integrated circuit that includes a memory system; a processor core including a one or more execution resource circuitries configured to execute micro-ops to support an instruction set architecture including macro-ops, wherein the processor core is configured to fetch macro-ops from the memory system in a program order; and a fusion circuitry that is configured to: detect a sequence of macro-ops stored in a processor pipeline of the processor core, the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor pipeline that stores vector instructions received from a scalar dispatch stage of the processor pipeline; determine a micro-op that is equivalent to the first macro-op followed by the second macro-op; and forward the micro-op to at least one of the one or more execution resource circuitries for execution.

In the ninth aspect, the first macro-op may be a vector instruction, the second macro-op may be a vector instruction, and the first register may be a vector register of the instruction set architecture. In the ninth aspect, the first macro-op may be a stand-alone instruction that can be executed independently of the second macro-op. In the ninth aspect, vector length may be a dynamically configurable parameter of the processor core and the fusion circuitry may be configured to check that the first macro-op and second macro-op have a same vector length as a condition for determining the micro-op. In the ninth aspect, the fusion circuitry may be configured to check that the first macro-op and second macro-op have a same mask argument as a condition for determining the micro-op. In the ninth aspect, the first macro-op may be a vector move instruction and the second macro-op may be a destructive vector multiply accumulate instruction. In the ninth aspect, the first macro-op may be a masked vector merge instruction and the second macro-op may be a destructive vector multiply accumulate instruction. In the ninth aspect, the first macro-op may be a scalar-to-vector move instruction and the second macro-op may be a destructive vector multiply accumulate instruction. In the ninth aspect, the processor core may be an in-order machine. In the ninth aspect, the processor core may be an out-of-order machine that includes an internal in-order decoupled vector queue, and the fusion circuitry may be configured to detect the sequence of macro-ops when dispatching vector instructions to reservation stations. In the ninth aspect, the instruction set architecture may be a RISC-V instruction set architecture.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
   a memory system;
   a processor core including a one or more execution resource circuitries configured to execute micro-ops to support an instruction set architecture including macro-ops, wherein the processor core is configured to fetch macro-ops from the memory system in a program order; and
   a fusion circuitry that is configured to:
   detect a sequence of macro-ops stored in a processor pipeline of the processor core, the sequence of macro-ops including a first macro-op identifying a first register as a destination register followed by a second macro-op identifying the first register as both a source register and as a destination register, wherein one or more intervening macro-ops occur between the first macro-op and the second macro-op in the program order;
   determine a micro-op that is equivalent to the first macro-op followed by the second macro-op; and
   forward the micro-op to at least one of the one or more execution resource circuitries for execution.

2. The integrated circuit of claim 1, in which the first macro-op is a vector instruction, the second macro-op is a vector instruction, and the first register is a vector register of the instruction set architecture.

3. The integrated circuit of claim 2, in which the one or more intervening macro-ops are one or more scalar instructions of the instruction set architecture.

4. The integrated circuit of claim 1, in which the fusion circuitry is configured to detect the sequence of macro-ops when the first macro-op and the second macro-op are stored in an instruction queue in a vector dispatch stage of the processor pipeline, and the one or more intervening macro-ops are sent to a scalar dispatch stage of the processor pipeline that operates in parallel with the vector dispatch stage.

5. The integrated circuit of claim 1, in which the first macro-op is a stand-alone instruction that can be executed independently of the second macro-op.

6. The integrated circuit of claim 1, in which vector length is a dynamically configurable parameter of the processor core and the fusion circuitry is configured to:
   check that the first macro-op and second macro-op have a same vector length as a condition for determining the micro-op.

7. The integrated circuit of claim 1, in which the fusion circuitry is configured to:
   check that the first macro-op and second macro-op have a same mask argument as a condition for determining the micro-op.

8. The integrated circuit of claim 1, in which the first macro-op is a vector move instruction and the second macro-op is a destructive vector multiply accumulate instruction.

9. The integrated circuit of claim 1, in which the first macro-op is a masked vector merge instruction and the second macro-op is a destructive vector multiply accumulate instruction.

10. The integrated circuit of claim 1, in which the first macro-op is a scalar-to-vector move instruction and the second macro-op is a destructive vector multiply accumulate instruction.

11. The integrated circuit of claim 1, in which the processor core is an in-order machine.

12. The integrated circuit of claim 1, in which the processor core is an out-of-order machine that includes an internal in-order decoupled vector queue, and the fusion circuitry is configured to detect the sequence of macro-ops when dispatching vector instructions to reservation stations.

13. A method comprising:
   detecting a sequence of macro-ops stored in a processor pipeline of a processor core, the sequence of macro-ops including a first macro-op identifying a first register as a destination register followed by a second macro-op identifying the first register as both a source register and as a destination register, wherein one or more intervening macro-ops occur between the first macro-op and the second macro-op in a program order used to fetch macro-ops from memory;
   determining a micro-op that is equivalent to the first macro-op followed by the second macro-op; and
   forwarding the micro-op to at least one of one or more execution resource circuitries of the processor core for execution.

14. The method of claim 13, in which the first macro-op is a vector instruction, the second macro-op is a vector instruction, and the first register is a vector register.

15. The method of claim 14, in which the one or more intervening macro-ops are one or more scalar instructions.

16. A method comprising:
   detecting a sequence of macro-ops stored in a processor pipeline of a processor core, the sequence of macro-ops including a first macro-op identifying a first register as a destination register followed by a second macro-op identifying the first register as both a source register and as a destination register, when the first macro-op and the second macro-op are stored in an instruction queue in a vector dispatch stage of the processor pipeline that operates in parallel with a scalar dispatch stage of the processor pipeline;
   determining a micro-op that is equivalent to the first macro-op followed by the second macro-op; and
   forwarding the micro-op to at least one of one or more execution resource circuitries of the processor core for execution.

17. The method of claim 16, in which the first macro-op is a vector instruction, the second macro-op is a vector instruction, and the first register is a vector register.

18. The method of claim 16, in which the first macro-op is a stand-alone instruction that can be executed independently of the second macro-op.

19. The method of claim 16, in which vector length is a dynamically configurable parameter of the processor core, comprising:
   checking that the first macro-op and second macro-op have a same vector length as a condition for determining the micro-op.

20. The method of claim 16, comprising:
   checking that the first macro-op and second macro-op have a same mask argument as a condition for determining the micro-op.

* * * * *